Figure 1:
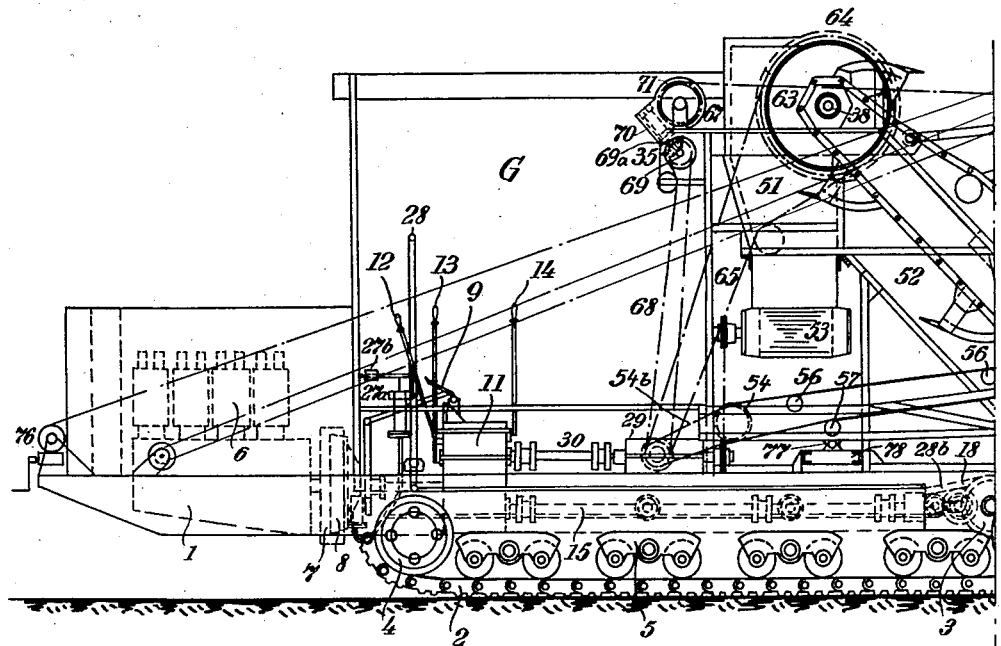

Oct. 27, 1931.  H. SÖLTER ET AL  1,829,162

CABLE LAYING MACHINE AND METHOD OF LAYING CABLE

Filed Oct. 11, 1928  4 Sheets-Sheet 1

Inventors:
Hugo Sölter and
Hermann Cornelius,
Atty.

Oct. 27, 1931.   H. SÖLTER ET AL   1,829,162
CABLE LAYING MACHINE AND METHOD OF LAYING CABLE
Filed Oct. 11, 1928   4 Sheets-Sheet 2
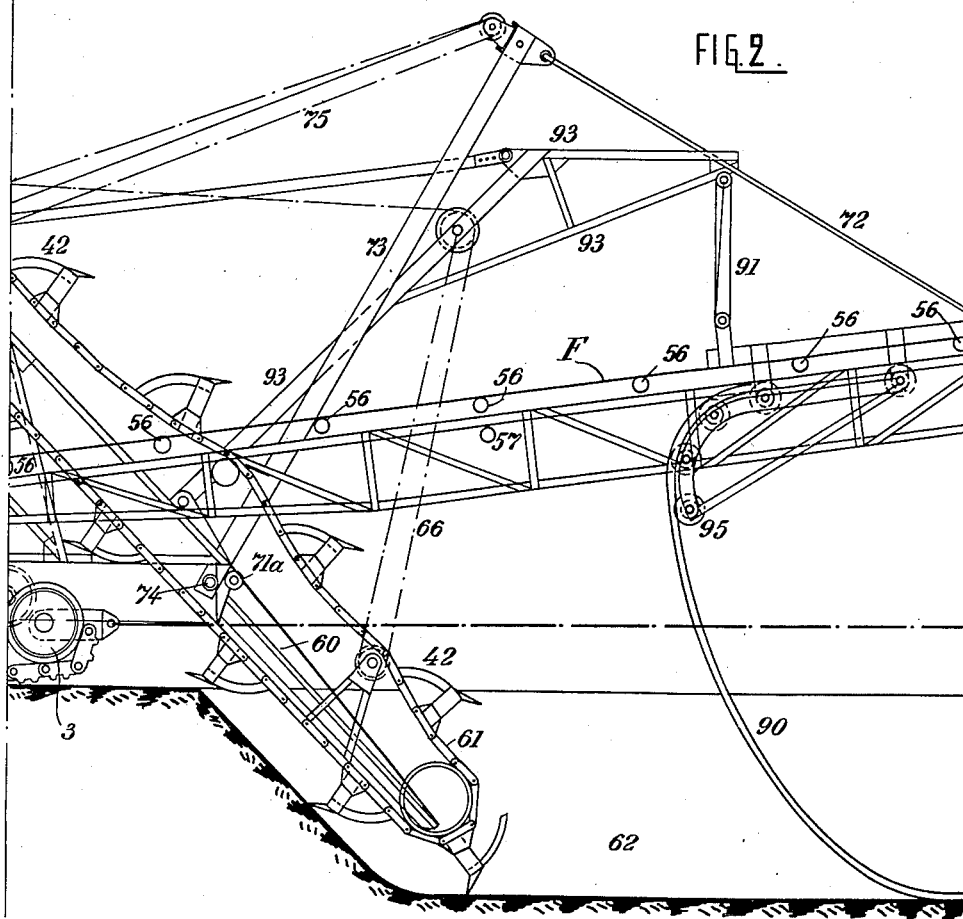
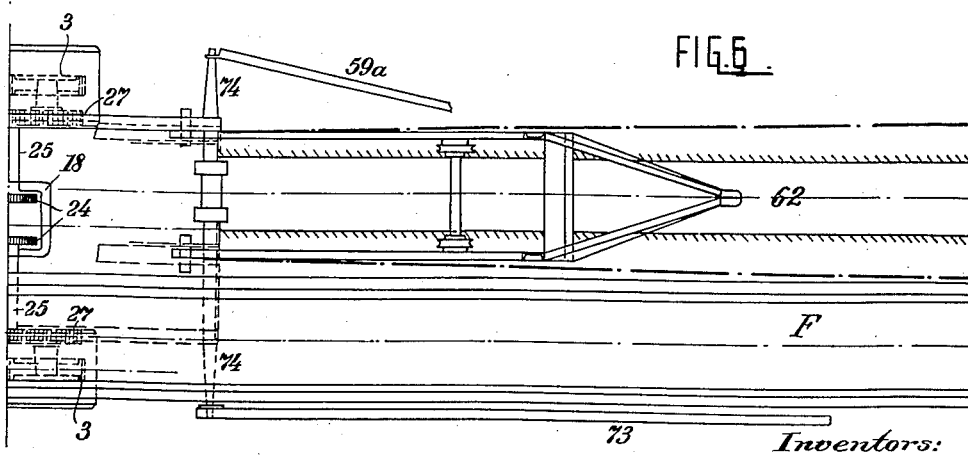
Inventors:
Hugo Sölter and
Hermann Cornelius,
Atty.

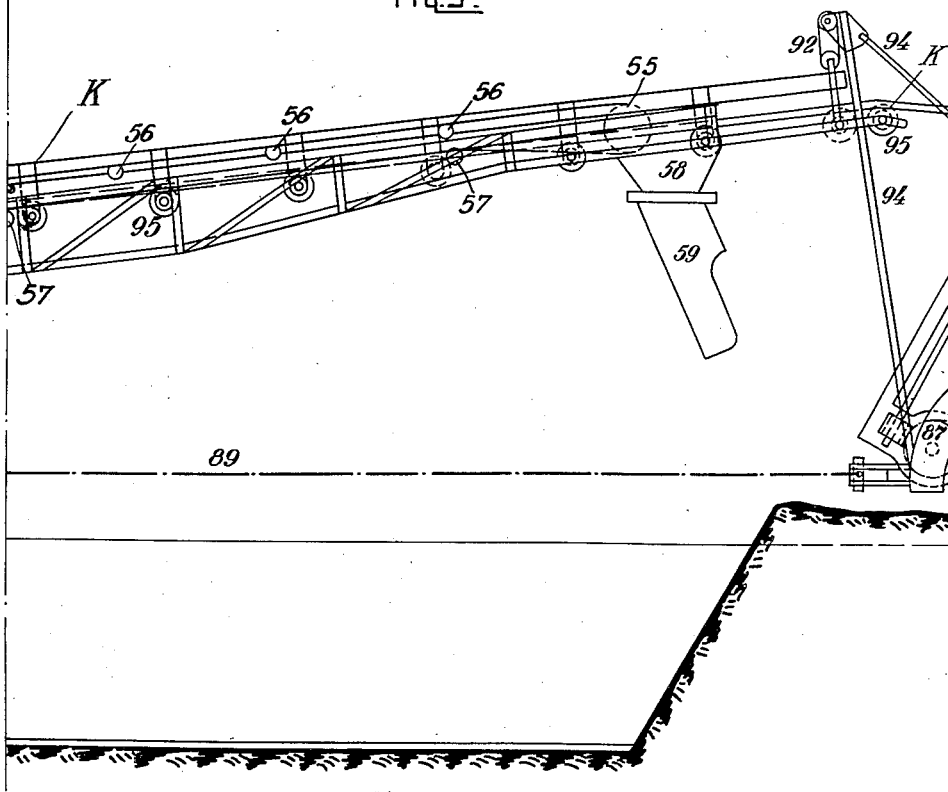
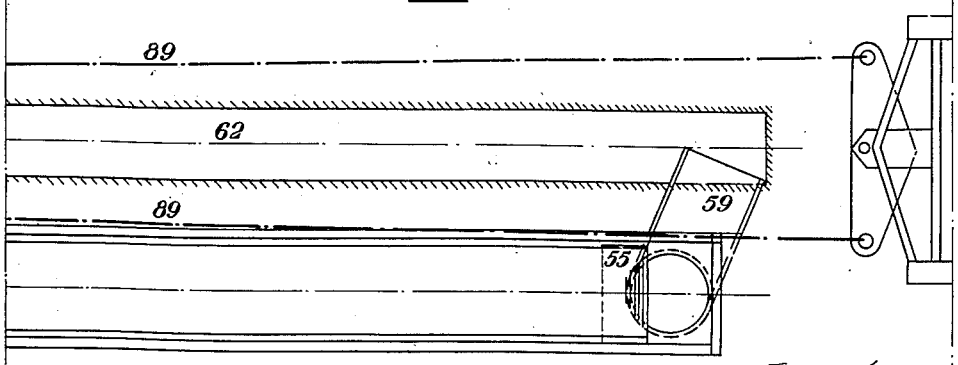

Oct. 27, 1931.  H. SÖLTER ET AL  1,829,162
CABLE LAYING MACHINE AND METHOD OF LAYING CABLE
Filed Oct. 11, 1928   4 Sheets-Sheet 4
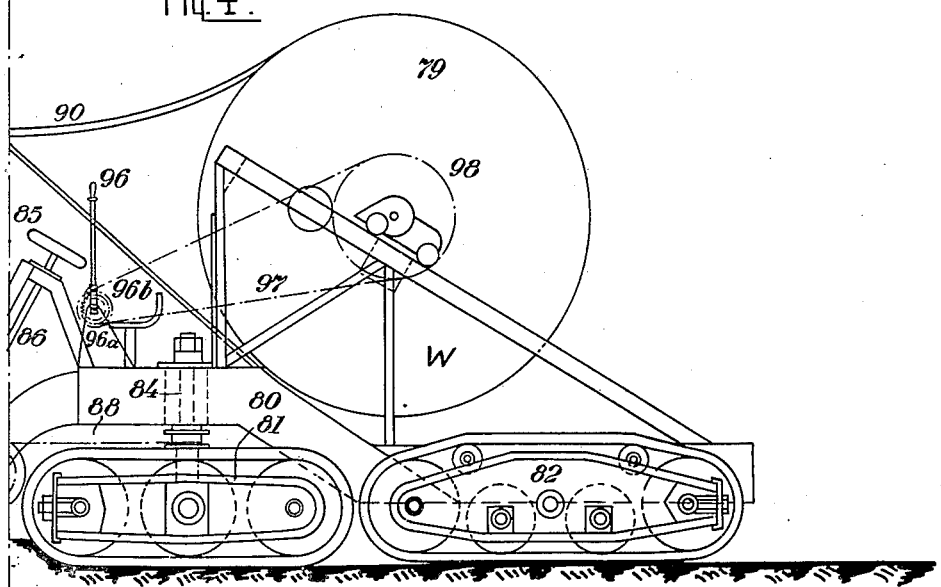
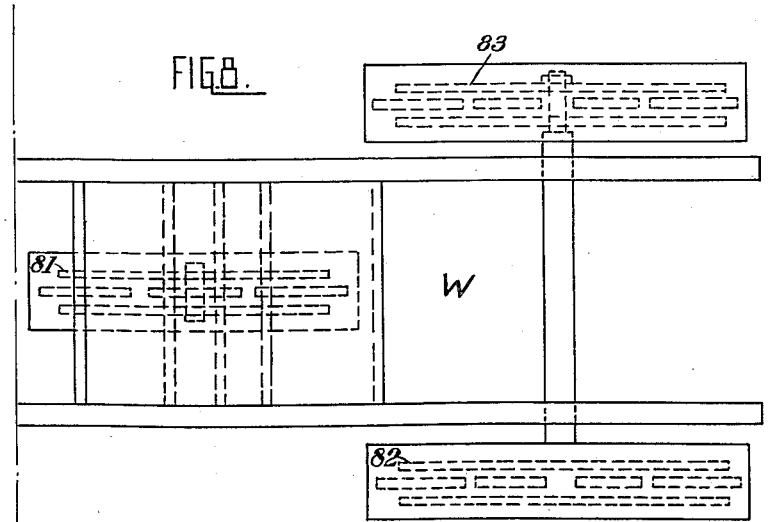
Inventors:
Hugo Sölter and
Hermann Cornelius, Patented Oct. 27, 1931

1,829,162

UNITED STATES PATENT OFFICE

HUGO SÖLTER AND HERMANN CORNELIUS, OF BAD OEYNHAUSEN, GERMANY, ASSIGNORS TO EISENWERK WESERHÜTTE AKTIENGESELLSCHAFT, OF BAD OEYNHAUSEN, GERMANY

CABLE LAYING MACHINE AND METHOD OF LAYING CABLE

Application filed October 11, 1928, Serial No. 311,913, and in Germany October 11, 1927.

Our invention relates to an improvement in cable laying machines and in the art of laying cables.

It has already been proposed to lay electric cables by machine instead of by hand. Such a machine comprises a vehicle which, similarly to the ordinary cable truck, is adapted to receive a drum from which runs off the cable to be laid and which is furnished with a dredging or excavating device for digging the trench to accommodate the cable and also with a conveyor device for throwing the earth removed back into the trench after the laying of the cable and thereby filling the same in. The procedure whereby the cable is laid with the assistance of such a machine is thus continuous: as the machine moves forward the trench is dug, the cable laid and the trench filled in again so that comparatively little handwork is necessary. In practice, however, it has not hitherto proved feasible to carry the method into effect because it requires a travelling chassis which is capable of accommodating the cable drum, the trench excavating device and the conveyor mechanism which returns the earth removed back into the trench; such a chassis is as a result much too heavy to be used since the weights to be accommodated together on this travelling chassis are far too large in practice to be dealt with. In order to avoid this defect it is proposed according to the invention to provide separate chassis for the trench digging device and for the cable truck and to cause the latter to run behind said trench digging device, to guide the cable running off from the drum forwardly to a point between the trench digging device and the filling in point and to lower said cable into the trench at this point. Numerous advantages are thus obtained: firstly the weight of the cable drum on the one hand and that of the trench digging device together with the conveyor mechanism on the other are divided between two different chassis which do not run on the ground at one and the same point and are therefore not unduly difficult to move. Furthermore the cable truck need not run with its wheels or endless tracks directly beside the edges of the already excavated open trench which with moderately soft ground is scarcely feasible, and finally the conveyor mechanism for the earth raised is not disproportionately long and heavy. Thus a cable laying method is created which is capable of being carried into effect in practice in a very advantageous fashion.

In carrying the method into execution the cable truck may be employed for pressing down the soil since said truck runs behind the trench digging device and is always located at a point whereat the cable has already been laid in the trench and the soil replaced therein. The cable truck may be driven separately although the procedure is simplest if it is drawn by the trench digging device.

As already stated the machine for carrying the method into effect preferably includes a trench digging device, together with a conveyor mechanism on to which the soil raised passes and whereby it is reconducted, at a point further to the rear, back into the trench in order to fill the latter; it also includes a cable truck running behind the trench digging device and coupled in any desired manner with said trench digging device so that it follows the latter always preferably at an equal interval; furthermore the machine preferably includes a cable guideway arranged between the cable truck and the trench digging device and adapted to cooperate with said cable truck to roll off the cable from the drum on the cable-truck and to carry the cable on said guideway as far as immediately to the rear of the trench digging device, at which point the cable is laid into the trench. From this point of introduction of the cable into the trench as far as to the refilling point the cable during progress of the work will remain in an open track of the trench, so that said cable at this place may be covered up with protective plates or the like by a man who accompanies the machine during its forward travel.

One embodiment of a cable laying machine suitable for carrying into effect the cable laying method provided for by the invention is illustrated by way of example in the accompanying drawings in which Figs. 1, 2, 3, and 4 are partial side-elevations of the cable laying machine according to this invention and Figs. 5, 6, 7 and 8 partial plan-views to Figs. 1, 2, 3, and 4 respectively. It may be noted that the partial side-elevations represented in Figs. 1, 2, 3 and 4 as well as the partial plan-views shown in Figs. 5, 6, 7 and 8, is put together in the sequence shown in the drawings, will form a complete side-elevation and a complete planview respectively of the machine.

The embodiment shown in the drawings is so designed that the point to which the cable guideway extends from the cable truck is located so far in front of the point at which the conveyor device redeposits the removed soil in the trench as to leave an open accessible length of trench. Thus a man may accompany the trench-digger and the cable-truck, proceeding at the same speed as they advance, and might for example cover the cable with protective plates. In addition the cable truck has a roller, in the form of an endless-track chainband, which lies in the vertical centre plane of the dredger chain of the trench digger to press down the replaced soil.

The cable truck is provided with driving means which are so associated with the chassis of the excavating machine or trench digger as to cause the cable truck to follow said chassis in the course of its progress. While obviously a great variety of mechanism may function as such driving means, in the embodiment shown, the driving means are constituted by two ropes connecting the cable truck to the chassis and being so disposed at either side of the trench as not to interfere with the filling in of the soil. The cable guide-way is supported at one end from the cable truck (instead of being arranged on a separate chassis running beside the trench) and is suspended at the other end by means of a pulley block gear from a cantilever extension of the cantilever proper of the trench digger, this being of advantage not only in respect of satisfactory combination between parts of the machine but also as regards the weight distribution. The trench digger and earth conveyor device are preferably not disposed in the central vertical plane of the chassis but laterally and on different sides thereof. Thus the conveyor does not lie above the excavated trench and does not interfere with the entry thereinto of the cable, while the arrangement of the trench digger and the conveyor mechanism on different sides of the central plane balances the machine and prevents the chassis being loaded one-sidedly provided that the distance of said devices from the central plane are appropriately dimensioned.

Figure 5:
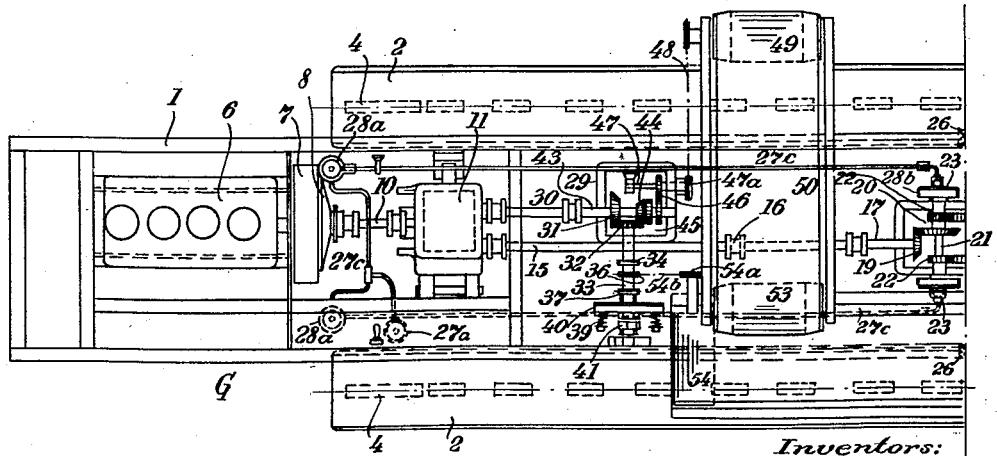

The drawings show the trench digger G, the conveyor device F, the cable truck W and the cable guideway K. The trench digger together with its auxiliary mechanisms S is mounted on the chassis I supported by endless track chains 2. Said chains run over track driving wheels 3 and guide rolls 4 and the chassis is supported thereon by roller bogies 5 pivotally mounted on sprung axles as shown in Fig. 1. The forward part of the chassis accommodates a driving motor 6 which is of any appropriate type. An extension of the motor-shaft carries a flywheel 7 and a spring pressure frictional cone clutch 8 as indicated in Figs. 1 and 5. This clutch may be actuated by the pedal 9 to transmit motion by way of a shaft 10, which is pivotally mounted on both of its ends in claw-couplings to the main gear box 11, as indicated in Figs. 1 and 5. The main gear box 11 comprises a four-speed gear of the Norton-type serving to drive the wheels 3, a reduction gear consisting of intermediate gear-wheels and a further intermediate or transmission gear serving for the drive of the trench-digger and the band-conveyors. The several gears may be individually actuated by means of three hand-levers 12, 13 and 14 which are provided on the gear-box 11, as shown in Fig. 1. The transmission-shaft 15 which extends towards the rear with regard to the longitudinal direction of the trench-digger and is pivotally mounted on both of its ends in flexible clutches and guided at its central part by means of a ball-bearing 16, transmits motion to the actuating shaft 17 for the rear gear-box 18. A transverse clutch-shaft 21 of the rear gear-box 18 is driven by means of a pair of bevel-gears 19, 20. The endless track chains 2 are driven from said shaft 21 through the intermediary of hydraulically operated laminated clutches 23 adapted to drive pinions 22 which are mounted on hubs loosely rotatable on said shaft 21. These hydraulic couplings 23 are mounted upon the ends of the shaft 21 projecting from the gear-box 18 and are both equipped with a band-brake in such a way that in disengaged condition of the coupling the pinion 22 which is mounted within said gear-box may be braked. By so combining the hydraulic couplings 23 with a brake it will be possible to drive one of the endless track chains, at the same time braking the other, so that steering of the trench-digger may be effected by the endless track chain this causing the trench-digger to be turned around the centre of the endless track chain under action of the brake. The pinions 22 transmit motion to the driving wheels 3 for the endless track chains 2 by way of gear-wheels 24, shafts 25 and pairs of gear-wheels 26, 27. If both hydraulic couplings are in engaged condition, both endless track chains will be uniformly driven and the trench-digger will move forward in straight direction.

The hydraulic pressure necessary for operating the couplings 23 may be produced by a weighted piston movable within a cylinder 27a. Inserted in the liquid supply-pipe 27c are two controlling cylinders 28a which may be actuated by means of a hand-lever 28, permitting application of hydraulic pressure to the coupling to be at a time engaged. The hand-brake 28b which is associated with the hydraulic couplings 23 will simultaneously be actuated with the application of hydraulic pressure by means of said hand-lever 28. The drive of the excavating mechanism, of the earth conveyor devices and of the hoisting mechanism for the bucket-guide is derived from a gear-box 29 arranged in the central part of the chassis, and driven from the front gear-box 11 by means of a shaft 30 which is yieldingly mounted on both of its ends in tooth clutches. The intermediate or transmission gear provided within the main gear-box and serving for the drive of the shaft 30 may be disengaged by means of a hand-lever. The drive of a transverse dredger drum coupling shaft 33 mounted in box 29 is effected by means of a shaft 43 coupled to shaft 30 and by means of bevel-gears 31 and 32 mounted on the respective shafts and provided in the middle gear-box 29. Mounted upon the shaft 33 is a sprocket-wheel 34 which serves for operating an upper gear-box 35, mounted by means of a suitable frame-work on the chassis 1 as shown in Fig. 1, while another sprocket-wheel 36 is mounted on the shaft 33, which serves for driving the longitudinal earth conveyor. Finally, a driving sprocket-wheel 37 is loosely mounted on the shaft 33 by suitable bearing sleeves and serves for driving a dredger drum shaft 38 (Fig. 1). The rotation of shaft 33 is transmitted to the wheel 37 through the intermediary of a slip-clutch comprising a disc-shaped extension on wheel 37, which is in contact with a second disc 40 subjected to the pressure of adjustable springs 39. This disc 40 may be coupled with the shaft 33 by means of a clutch comprising a toothed clutch sleeve 41, which is mounted on shaft 33 for common rotation, but may be displaced in the direction of the axis of said shaft to engage suitable clutch teeth on said disc shaped extension. By means of this claw-clutch the excavating mechanism may be put out of operation and by means of the slip-clutch it is possible to transmit only a definite power to the dredger drum shaft, the amount of this power depending on the adjustment of the pressure of the springs 39. If, therefore, an excessive stress should arise on the buckets 42, the disc 40 and said disc-shaped extension will be caused to slide relatively to each other.

The bevel-gear 32 mounted upon the dredger drum shaft 33 is in engagement with a double gear 44 composed of a bevel-gear and of an ordinary gear-wheel integral therewith and loosely mounted on shaft 43. A similar gear-wheel 45 is fixedly mounted on the shaft 43. Parallel to shaft 43, another shaft 47 is mounted in the gear box 29 carrying a shiftable gear 46 mounted for common rotation and provided with suitable shifting means, not shown, whereby it may be alternatively brought into engagement with gear 45 or gear 44. By reason of the fact that the double gear 44 rotates in an opposite sense to the rotation of the shaft 43 it is possible to cause the displaceable gear-wheel 46 to rotate in the one or other direction in dependence upon whether said gear-wheel 46 is meshing with the gear-wheel 44 or with the fixed gear-wheel 45. The outer sprocket-wheel 47a on the shaft 47 drives, by means of a roller-chain 48, the driving drum 49 of a transverse conveyor, mounted in the frame work on chassis 1, said transverse conveyor being constructed as a band-conveyor. The band 50 of this conveyor passes underneath the storage hopper 51 (Fig. 1), provided on the upper part of the framework of the chassis 1 and is carried around the driving drum 49 and a delivery drum 53 in order to supply the excavated soil to the longitudinal conveyor device F, which is likewise constructed as a band conveyor having a driving drum 54 (Fig. 1), a discharge drum 55 (Fig. 7), and band supporting rollers 56 and 57. (Fig. 2 and 3.) The drum 55 and the rollers 56 and 57 are mounted in an adjustable girder having its one end pivotally supported at 77 on the chassis 1 and its other end kept at an adjustable elevation by suitable means which will be described later. The driving drum 54 of the longitudinal conveyor F is mounted in suitable bearings on chassis 1 and driven by a sprocket-wheel 54a from the afore-mentioned sprocket-wheel 36 by means of a chain 54b. The delivery drum 55 (Fig. 7) throws the excavated soil into a hopper 58 which discharges into a chute 59 swingable about its vertical axis. By means of this swingable chute 59 the stream of earth discharged from said chute may be properly directed so as to drop exactly into the centre of the excavated trench.

The bucket guide-frame 60 (Fig. 2) carrying the bucket-chains 61 with the buckets 42 serving for excavating the trench is provided laterally of the centre-plane of the chassis 1 and the trench will, therefore, be positioned laterally of said centre-plane. The bucket-chain 42 is driven by the dredger drums 63 (Fig. 1), which are of hexagonal cross-sectional shape and mounted upon the dredger drum shaft 38, supported in the framework on chassis 1 in suitable bearings. The dredger drum shaft 38 is driven by a sprocket-wheel 64 and a roller chain 65 from the sprocket-wheel 37 as may be seen from Fig. 1.

The bucket guide-frame 60 connected to the frame work on chassis 1 to be swingable about a shaft 71a may be lifted and lowered by means of a rope 66 which is carried around a rope-sheave 67 (Fig. 1). The latter again is driven from the upper gear-box 35, which is operatively connected to the sprocket-wheel 34 by means of a roller-chain 68 (Fig. 5). The latter is driven from the shaft 33 through the intermediary of a reverse gear mounted in the afore-mentioned upper gear box 35 and comprising a primary shaft 69 carrying a sprocket wheel connected with the sprocket-wheel 36 by a chain 68. The primary shaft 69 carries two longitudinally shiftable bevel gears, which by a suitable gear-shift lever not shown may be alternatively brought into engagement with a bevel gear 69a mounted on an inclined shaft journalled in the box 35, whereby the latter shaft is rotated in the one or the other direction as desired. The bevel gear 69a is connected with a worm 70 meshing with a worm wheel 71 attached to the shaft of the rope-sheave 67. The lifting and lowering of the bucket guide-frame 60 around the shaft 71a as a centre may be effected by actuating said bevel-wheel change gear.

It will be clear from the above that as has already been mentioned the trench excavating mechanism on the one hand and the girder or cantilever of the conveyor device on the other hand are arranged not in the central plane of the chassis of the trench excavating device but on opposite sides of said central plane. If the distance of the weights from the central plane are appropriately selected one-sided loading of the chassis may readily be avoided. Furthermore this arrangement has the advantage that the cantilever of the conveyor device is not disposed over the trench to be excavated but laterally thereof and does not, therefore interfere with the laying of the cable therein. It is moreover clear that not only the bucket chain but also the conveyor mechanism, that is the longitudinal and transverse conveyors, and the hoist device for the bucket chain are driven from the shaft 30. The supporting girder or framework of the longitudinal conveyor F is suspended as shown in Fig. 2 by means of a pair of ties 72 from a separate fork shaped support 73, having its lower ends mounted at either side of the band-conveyor upon a supporting axle 74, transversely arranged on the chassis 1. The support 73 is kept in adjustable position by means of a pulley block gear 75, whose rope has its free end wound on a manually operated worm-wheel hoist gear 76 (Fig. 1). The framework of the longitudinal conveyor F is supported on a pivot 77 which rests on a bearing bracket 78 fixed to the chassis 1. Lateral tilting of said framework is prevented by suitable tubular braces indicated at 59a, which are fixed to the supporting axle 74. By operating the hoist 76 by hand, the cantilever 73, which is supported in bearings on the supporting bearings axle 74, may be lowered or lifted at will, thus causing the longitudinal conveyor F to be lowered or raised accordingly around the shaft 77 after release of said brace 59a. In this manner an inclined position of the trench digging device owing to differences in the level of the soil may be compensated for and the point of discharge of the pivoted chute 59 may always be kept at an even height above the trench.

The cable drum 79 of the cable truck W is supported on a chassis 80 running on three endless track bogies 81, 82 and 83, as shown in Figs. 4 and 8. The centres of gravity, in plan, of these three endless tracks are arranged in a triangle, the two endless tracks 82, 83 being laterally arranged, and the endless track 81 in the central plane and in front of the other two. This central endless track is adapted to pivot about a vertical shaft 84 so that the truck can be steered with its assistance, this being effected for example by means of a hand wheel 85, capable of rotating the shaft 84 through the shaft 86, worm gear 87 and rope 88.

This cable truck will run behind the trench digger in such fashion that the central endless track 81 passes over the trench, refilled with the excavated soil. In this manner a part of the great weight of the cable truck is utilized to press down the soil refilled in the trench in the manner shown in Fig. 4. The cable truck may be driven separately, although in the example illustrated it is drawn by the trench digger by two ropes 89 (Figs. 3 and 7), located on either side of the trench so that it requires no separate driving gear.

According to the method of cable laying of the present invention the cable 90 running off from the cable drum 79 is conducted forwardly preferably into the vicinity of the trench digger and is lowered into the trench there. This may be manually performed by operators who proceed beside the trench holding the cable in their hands or by means of any suitable guide device advancing beside the trench. In the example illustrated this guiding of the cable to the front, in such fashion, that it is only lowered into the trench comparatively close behind the trench digger, is performed by the guide-way K, suspended on the one side from a framework 94 (Fig. 4) on the chassis 80 of the cable truck and on the other side by means of pulley block gears 91, 92 from a cantilever 93 rearwardly and upwardly projecting from the trench digger chassis. The cable passes forwardly from the cable drum over rollers 95 suspended from the cable guide K and is lowered into the trench comparatively close behind the bucket guide frame. The soil raised by the trench digger and conducted rearwardly by the conveyor apron F falls through the pivotal chute 59 back into the trench and covers the cable, being pressed down by the endless track 81. Between the chute 59 and the cable guide rollers 95 nearest the trench digger there remains a free accessible length of trench, in which a man may proceed and, if it is desirable, cover the cable with protective plates.

With the aid of a machine, such as that described, the method, forming the subject of the present application, may be carried into effect in an extremely convenient manner, with very little assistance and at a high speed. The trench digger and cable truck move forward at a uniform speed, the trench digger excavates the trench, the cable is lowered over the guide way behind said trench digger into the trench excavated, the soil raised is employed for filling the trench further to the rear and said soil is pressed down by the cable truck.

It will be obvious, that the machine may be modified in numerous directions. For carrying the cable laying method according to the invention into effect it is, as has already been mentioned in no way necessary, that the cable truck should be drawn along by the trench digger. It might be driven separately provided, that care is taken that it always advances at approximately the same speed as the trench digger. If it has separate driving gear, this might be coupled with that of the trench digger in order to ensure equal speeds of advance, which would also be extremely simple, if the drive were electrical. The simplest and most advantageous construction, however, appears to be that shown in the example illustrated, wherein the cable truck is drawn along by the trench digger by means of two ropes disposed on either side of the trench.

As has already been mentioned, also it is not absolutely necessary to provide a separate guide-way for the cable; on the contrary the cable might be laid by hand in the trench at the correct point. If a guide-way is employed, this may be driven separately, although obviously it is simpler to mount the same on the cable truck and, for the purpose of distributing the weight better, also at the same time on the trench digger as illustrated.

The construction of trench excavating device illustrated should also be regarded as an example since said device might be of a different nature, for example a bladed wheel. The conveyor band for carrying the excavated soil rearwardly may be replaced by suitable devices of other types. The offsetting of the bucket chain guide frame and the conveyor cantilever from the centre plane of the trench digger chassis as shown in Fig. 6 is very advantageous, although not absolutely essential. Even if the conveyor framework were arranged in the centre plane, it would still be possible to lay the cable in the manner described by introducing it from the side and under the cantilever into the trench. Finally the construction of cable truck illustrated is not essential to the invention. The pressing down of the soil may be dispensed with under certain circumstances and also the steering of the cable truck may be effected in a manner other, than that illustrated in one of the ways general in endless track vehicles.

What we claim is:

1. In the art of laying a subterraneous cable supplied from a cable drum, the improvement, which, comprises excavating a trench in progressive manner, simultaneously conveying the excavated soil into the trench at a re-filling point situated rearwardly from the excavating point where the excavating operation is progressively carried on, conducting said cable drum progressively and in subsequence to said progressing refilling point along and over the re-filled trench to compress the re-deposited soil, drawing the cable from said drum, guiding it in forward direction and depositing it into the trench at a spot situated between said excavating point and said re-filling point.

2. A method of laying a subterraneous cable supplied from a cable drum by means of a trench excavating machine, comprising advancing said excavating machine to excavate a trench in continuous and progressive manner, conveying in a continuous operation the excavated soil into the trench at a re-filling point spaced from said machine, causing said cable drum to follow said excavating machine in its path in the course of its progress, simultaneously guiding the cable drawn from depositing it into the open trench at a point preceding said re-filling point.

3. The combination comprising a trench excavating machine, a conveyor associated with said excavating machine to re-deposit the excavated soil into the trench at a point spaced from said excavating machine, a vehicle carrying a cable supply, and means for advancing said vehicle and said excavating machine, the vehicle and excavating machine being connected whereby the vehicle is caused to follow the excavating machine in the course of its progress.

4. The combination comprising a trench excavating machine, a conveyor associated with said machine to re-deposit the excavated soil into the trench at a point spaced from said excavating machine, a vehicle carrying a cable supply and coupling means attached to said vehicle and to said excavating machine whereby the former is caused to follow the latter in the course of its progress at a predetermined distance.

5. The combination set forth in claim 4, in which said conveyor is so dimensioned, that said re-filling point is spaced from the excavating machine by a distance rendering the open trench accessible.

6. The combination comprising a trench excavating machine, a conveyor associated therewith to redeposit the excavated soil into the trench at a point spaced from said excavating machine, a vehicle carrying a cable supply and provided with an endless track-chain, and means for advancing said vehicle and said excavating machine, the vehicle and excavating machine being connected whereby the vehicle is caused to follow the excavating machine in the course of its progress, said vehicle being provided with steering means whereby said endless track-chain may be guided over the re-filled trench to compress the soil deposited therein.

7. The combination comprising a trench excavating machine, a conveyor associated with said excavating machine to deposit the excavated soil into the trench carrying a cable supply and two ropes attached to said vehicle and to said excavating machine, each rope being attached on one side of the excavating machine, whereby said excavating machine is connected to said vehicle.

8. A cable laying machine comprising a trench excavating machine constituted by a power driven vehicle and an excavating mechanism mounted thereon, a second vehicle carrying a cable supply and being coupled to said trench excavating machine to follow the latter in the course of its progress, and a cable guide carried by at least one of the afore-said vehicles in the rear of said excavating mechanism to guide the cable from said supply in a forward direction and to deposit the same into the open trench behind said excavating machine.

9. The combination comprising a trench excavating machine constituted by a power driven chassis and an excavating mechanism mounted thereon, a vehicle carrying a cable supply and connected to said chassis to be drawn thereby to follow the same in the course of its progress, said vehicle being provided with one endless track-chain in the front and two endless track-chains at the rear, said front track-chain being pivotally mounted about a vertical axis for the purpose of steering said vehicle so that its front track-chain may be guided on the path of said excavating mechanism.

10. The combination set forth in claim 6, in which said vehicle is supported by three endless track-chains, two at the rear and one at the front, said front chain being swingable about a vertical axis thereby constituting the afore-mentioned steering means of said vehicle.

11. A cable laying machine comprising a chassis, a trench excavating mechanism mounted thereon, a conveyor mounted on said chassis to receive the excavated soil from said mechanism and extending rearwardly with regard to the chassis to re-deposit said soil into the excavated trench at a point spaced from said excavating mechanism, and a cable guide carried by said chassis in the central plane of said excavating mechanism to guide a cable into the open section of said trench.

12. A cable laying machine comprising a trench excavating machine, a conveyor associated with said excavating machine to re-deposit the excavated soil into the trench at a point spaced from said excavating machine, a vehicle carrying a cable supply, driving means associated with said vehicle and said excavating machine to cause the former to follow the latter in the course of its progress, and a cable guide associated with said excavating machine and said vehicle and positioned therebetween to draw the cable in forward direction from said cable supply and to direct it into the trench at a point close behind said excavating machine.

13. The combination set forth in claim 12, in which said trench excavating machine and said vehicle are each provided with an individual steering mechanism.

14. A cable laying machine comprising a trench excavating machine a conveyor associated with said excavating machine to deposite the excavated soil into the trench at a distance from said excavating machine, a vehicle carrying a cable supply, coupling means attached to said vehicle and to said excavating machine whereby the former is caused to follow the latter in the course of its progress at a predetermined distance, and a cable guide carried by, and arranged between said excavating machine and said vehicle and including an element situated closely behind said excavating machine to guide and deposit in said trench the cable drawn from said supply, said conveyor being so arranged and dimensioned, that said distance is sufficient to render the deposited cable accessible.

15. A cable laying machine comprising a chassis, a trench excavating mechanism mounted thereon, a conveyor mounted on said chassis to receive the excavated soil and extending rearwardly with regard to the chassis to re-deposit said soil into the excavated trench at a point spaced from said excavating mechanism, said conveyor and said excavating machine being arranged on opposite sides of the central plane of said chassis, and a cable guide carried by said chassis and arranged behind the latter and in the central plane of said excavating mechanism to guide and to deposit a cable into the open trench.

16. The combination comprising a trench excavating machine constituted by a power driven chassis and an excavating mechanism mounted thereon, a vehicle carrying a cable supply and connected to said chassis to be drawn thereby to follow the same in the course of its progress, said vehicle being provided with one endless track-chain at the one end and with two endless track-chains at the other end, and with steering means whereby said first mentioned track-chain may be guided on the path of said excavating mechanism.

17. The combination comprising a chassis, a trench excavating mechanism and a conveyor both mounted on said chassis, said conveyor extending rearwardly and being arranged to re-deposit the excavated soil into the trench at a point spaced from said excavating mechanism, said conveyor and said excavating mechanism being arranged on opposite sides of the central plane of said chassis, a vehicle carrying a cable supply, and driving means associated with said vehicle and said chassis to cause the former to follow the latter in the course of its progress.

In testimony whereof we affix our signatures.

HUGO SÖLTER.
HERMANN CORNELIUS.